United States Patent [19]
Mak

[11] Patent Number: 5,420,943
[45] Date of Patent: May 30, 1995

[54] UNIVERSAL COMPUTER INPUT DEVICE

[76] Inventor: Stephen M. Mak, 4455 W. Los Feliz Blvd., #704, Los Angeles, Calif. 90027

[21] Appl. No.: 968,110

[22] Filed: Oct. 29, 1992

Related U.S. Application Data

[63] Continuation-in-part of Ser. No. 867,549, Apr. 13, 1992.

[51] Int. Cl.$^6$ .......................... G06K 9/22; G06K 9/20; G06K 7/10
[52] U.S. Cl. .......................... 382/313; 382/321; 345/166; 358/486; 235/466
[58] Field of Search .......................... 382/59, 62, 69, 67, 382/68, 61; 340/710, 708; 358/473, 474, 486, 488; 235/436, 440, 472, 454, 466, 495; 250/221; 345/163, 166

[56] References Cited

U.S. PATENT DOCUMENTS

| | | | |
|---|---|---|---|
| 4,048,617 | 9/1977 | Neff | 382/59 |
| 4,411,016 | 10/1983 | Wakeland | 382/62 |
| 4,521,772 | 1/1985 | Lyon | 340/710 |
| 4,538,072 | 8/1985 | Immler et al. | 250/568 |
| 4,553,035 | 11/1985 | Malinsky et al. | 382/61 |
| 4,606,069 | 8/1986 | Johnsen | 382/56 |
| 4,641,357 | 2/1987 | Satoh | 382/61 |
| 4,797,544 | 1/1989 | Montgomery et al. | 250/221 |
| 4,825,058 | 4/1989 | Poland | 235/472 |
| 4,860,377 | 8/1989 | Ishigaki | 382/59 |
| 4,942,621 | 7/1990 | Angwin | 382/59 |
| 5,058,188 | 10/1991 | Yoneda | 382/59 |
| 5,058,190 | 10/1991 | Levitt et al. | 382/68 |
| 5,130,847 | 7/1992 | Tsujioka | 358/473 |

OTHER PUBLICATIONS

The Wall Street Journal, Jan. 23, 1992, p. B1, "Personal Technology," by Walter S. Mossberg.
Business Machines, Nov. 1991, pp. 37, 38, 45–47, "Today's scanner market is a tough act to follow," by Jan Stafford.
Byte, Apr. 1991, Product Focus "Tame the Paper Tiger," pp. 220–238, By Stanford Hiehl and Howard Eglowstein.
PC Magazine, Nov. 12, 1991, Graphics "Quick Graphics on a Budget 12–Hand Scanners," by Ed Perratore, pp. 223–281.
PC Computing, Nov. 1991, "Optical Character Recognition," by Matthew Lake, pp. 358–359.
Byte, Feb. 1992, Scanner Advertisements (3).

*Primary Examiner*—David K. Moore
*Assistant Examiner*—Michael R. Cammarata
*Attorney, Agent, or Firm*—Daniel L. Dawes

[57] ABSTRACT

The invention is a universal input device for a computer which can be either used as a point-and-click bar code reader, a bar code scanner, mouse, handwriting input, or text scanner, all from an off-screen medium. The universal input device can be used to read both arbitrary user-defined bar code or standardized bar code. In either case, the bar code may symbolize any alphanumeric character or macro instruction for an operating system which is programmed on the computer. The universal input device uses a single line of linear CCD detectors. In the static mode, the single linear array is used as a point-and-click input device for bar code, provided that the optical length of the bar code is equal to or less than the length of the single linear array. In the linear mode, the bar code may exceed the optical length of the single linear array and the array then moved or scanned over the bar code. In the two-dimensional mode, a grid is used in combination with the single linear array to detect vertical and horizontal motion of the array. Alternatively, a scanning ruler with diagonal timing bars may be used to guide the array across the line of text which then processed for character recognition. Still further, the array can be used in the two-dimensional mode to provide a bit map of handwriting. Used to read bar codes or as a mouse, the input device can be used to simulate an ASCII keyboard to input ASCII codes corresponding to the alphanumeric characters.

7 Claims, 5 Drawing Sheets

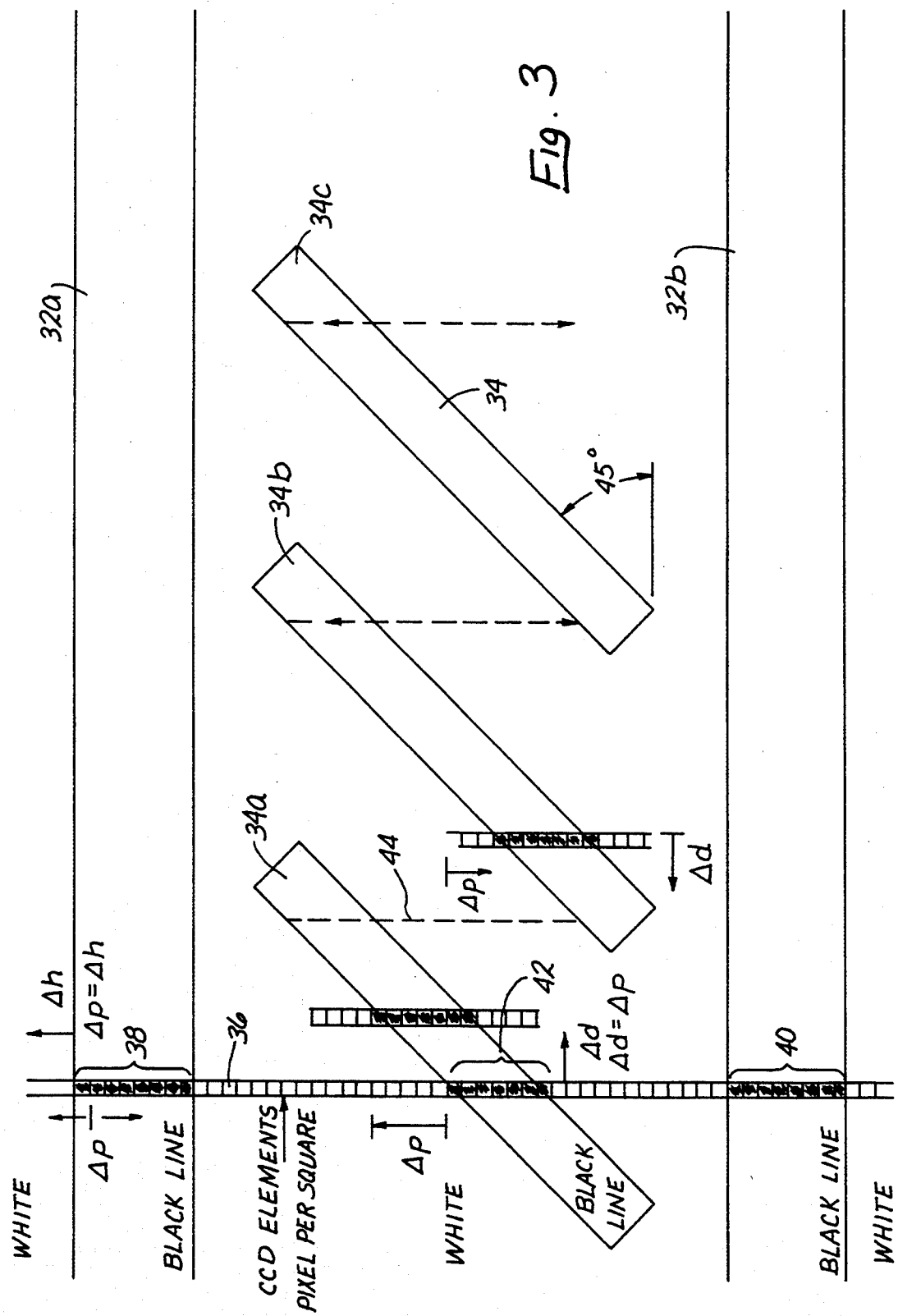

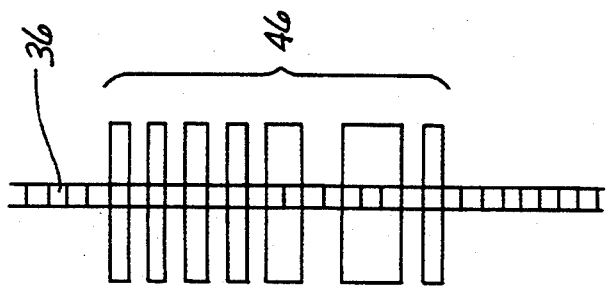
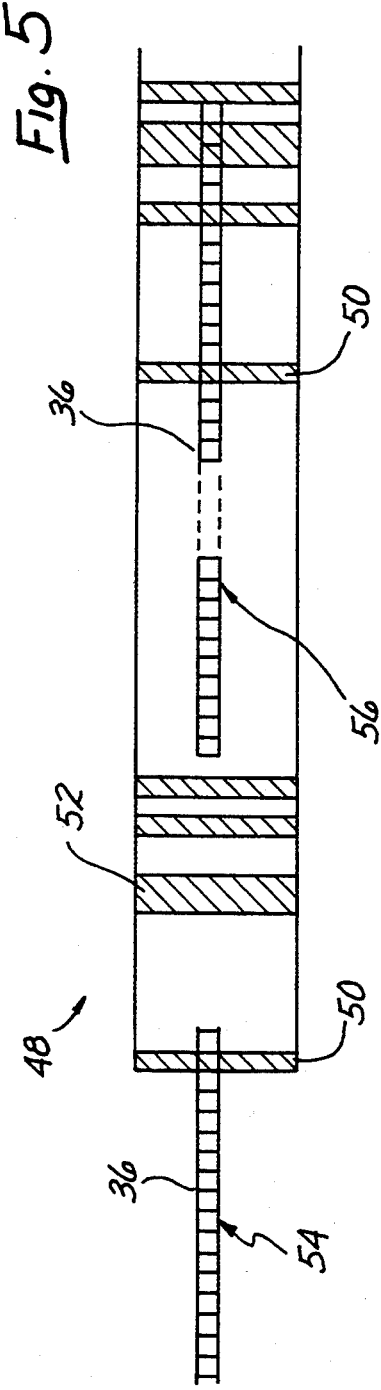

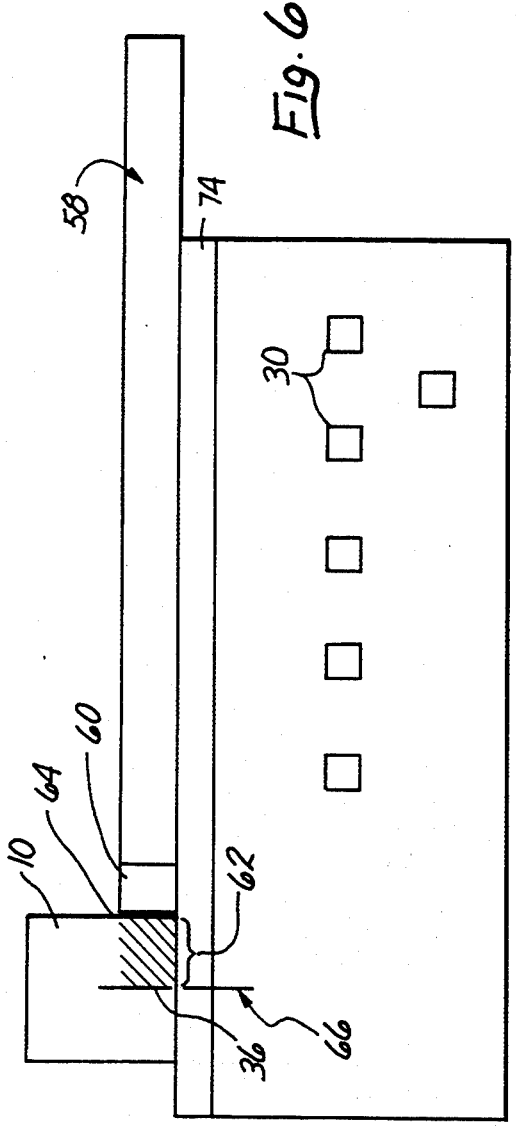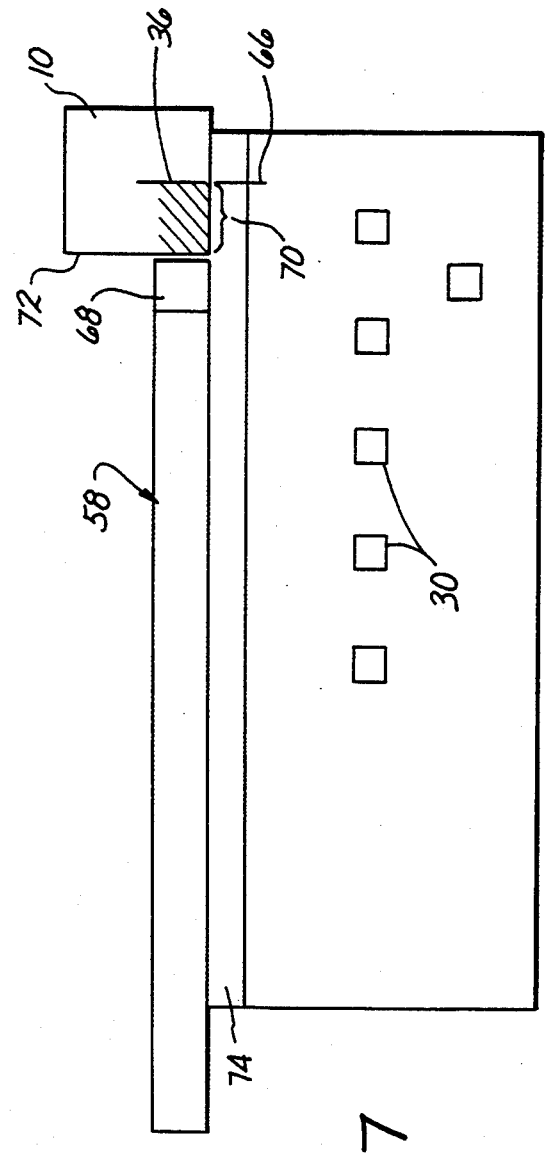

UNIVERSAL COMPUTER INPUT DEVICE

RELATED APPLICATION

This application is a continuation-in-part of U.S. patent application Ser. No. 07/867,549 entitled Apparatus and Method for a Text Input System, filed on Apr. 13, 1992 herein expressly incorporated by reference.

BACKGROUND OF THE INVENTION

1. Field of the Invention

The invention relates to the field of input devices for computers and in particular to an off-screen input device having the combined functions of a scanner, mouse, handwriting input and both a scanning and point-and-click bar code reader.

2. Description of the Prior Art

Devices for performing multiple types of input functions for computers are known in the art. Jones et al., "Combination Mouse, Optical Scanner and Digitizer Puck," U.S. Pat. No. 4,906,843 (1990) shows a hand held input device which is operated as a mouse to move a cursor in a display, used as a hand held optical scanner for entering computer characters or graphic information from a worksheet, and used as a digitizing puck for tracing and digitizing lines or curves on a worksheet overlaid with a digitizing pad. Unit 9 within housing 10 is provided with function keys 12 on its upper side. The unit can be used without one of at least two heads plugged in as a mouse with track ball 30 and with transducers to determine X and Y movements. With the scanning head plugged in., the unit is used for scanning or if used as a mouse, a third scanning wheel gives the amount and direction travelled which can be used for additional commands in a CAD/CAM program. The scanning head includes a primed circuit board 90, an optical transducer such as a CCD 92, and a light source 98. A third position transducer has an encoder disk 118 for providing distance and direction information. Digitizer puck 22 includes a flux producing element which inductively couples with a plurality of grid conductors in a conventional digitizing pad 24 shown in FIG. 2 thereby providing the coordinates of the puck relative to the pad.

While Jones shows a multiple use, input, hand-held device, it depends upon electro-optical decoders or electromagnetic flux sensors to provide the input information. Jones fails to have a scanner for graphic input or to realize that his device has any utility as mouse or drawing pen.

Massoudi, "Method for Orienting a Dual Mouse Optical Scanner," U.S. Pat. No. 4,984,287 (1991), shows the use of a mouse on an orthogonal grid. In FIG. 1, scanner 10 is used on a transparent pad 12 which includes a grid pattern 13. The scanner has an array section 24 with a light source 30 and detector 32. Each mouse position sensor has a light source 26 and a detector 28. The detectors are either CCD's or other light sensitive devices. Transparency 12 is transparent to visible light but not to infrared or ultraviolet so that by providing an infrared or ultraviolet light source for the position sensors and visible light for the scanning sensors, the two systems work without interference. The system is put into operation by initializing at an origin location for the dual mouse and then turning the scanner in a circular motion from horizontal to vertical on the grid. The computer remembers the maximum distance, DY, as the space between the two mice.

Massoudi shows optical sensing from a grid pattern using linear CCD's as a detecting device. FIG. 2 illustrates the relationship between a canted line of CCD detectors 48 relative to grid pattern 50/54 which is printed, dyed or formed on the surface leaving open blocks 58.

Keiji, "Input Device Possessing Plural Functions," U.S. Pat. No. 5,115,227 (1992) shows an input device which incorporates a plurality of input functions for use with a personal computer. Device 1 can function either as a mouse or scanner with the mode being selected by switch 43. The mouse function is performed with a track ball 2 using orthogonally placed encoders 7 and 8 for sensing the direction of motion. The scanner function is performed using a reading device 20 which is comprised of a light source 28, photoarray diode 26 and encoder 40 for sensing direction and distance. Keiji is dependent upon electromechanical encoders to determine movement, but is relevant for showing both scanning and mouse functions in a single hand-held device.

Montgomery et al., "Optical Scanner Including Position Sensors," U.S. Pat. No. 4,797,544 (1989), shows an optical dual mouse and scanner for use in character recognition, photocopying or other types of applications. Device 14 has one or two optical mice 19, 150, see FIG. 7, using as a sensor CCD 16 and light source 21 diagrammatically depicted in FIGS. 2 and 6. In one embodiment where the device is used to scan text 12 on page 11 of book 10, two colored, lined, transparent sheets are used as indicia of the location. The lines are colored, for example, red for the vertical and green for the horizontal, with the mice having sensors sensitive to these two colors to determine the motion and distance of the scanner in the two directions. In another embodiment, the device and computer is connected to a printer for copying to an optical character recognition unit having algorithms for processing the data in black and white or various shades of gray. Other embodiments of the device call for mechanical scan constraint or ruler, for a screen for scanning a projected image and for arms for use on a drafting table. See for example the depictions of FIGS. 8a–c and FIG. 12.

Knoll et al., "Process for Picking Up Navigation Data," U.S. Pat. No. 4,731,526 (1988) shows a device using a line code lattice and a scanning pen. The lattice has a bar code structure for recognizing the difference between the vertical and horizontal lines. For example, the horizontal line is provided with two thick bars and one thin bar. The vertical bar is distinguished by having two thin bars and one thick bar. The lattice can also be color coded, printed on a map or on a transparent carrier.

Poland, "Bar Code Reader Configuration and Control Using a Bar Code Menu to Directly Access Memory," U.S. Pat. No. 4,825,058 (1989) shows a bar code reader and control system using a menu to ,invoke instructions or macros which directly access the system memory of the computer, electronic instrument, or a bar code reader. Bar code reader 11 is operated by entering commands on keyboard 12 or by scanning a menu 15 with scanner 13. Commands entered either by keyboard 12 or scanning pen 13 are used to reconfigure the system by adding or changing codes and their functions. The systems uses an interpreter routine in the operating system of the bar code reader. Poland can be used to configure and control not only a bar code reader, but any type of electronic instrument or microprocessor.

Each of these prior art devices use multiple independent means, such as a track ball and scanner, or if only a scanner is used, do not fully function to replace all the input modes of a mouse, scanner, handwriting input, and both a scanning and point-and-click bar code reader. What is needed is a apparatus and methodology which can be inexpensively implemented in which a single linear CCD array can be used for multiple modes of input including scanning, mouse input, handwriting input, and custom and standard bar code reading.

BRIEF SUMMARY OF THE INVENTION

The invention is an apparatus for providing input to a computer from an off-screen medium. "Off-screen medium" is defined for the purposes of this specification as any surface other than the computer screen or display on which or from which markings or information may be optically read or written with or without the aid of a machine. In the illustrated embodiment the off-screen medium is a mouse pad or a printed sheet of paper. The apparatus comprises a single linear array of optical detectors, including a related illumination source and optics, and a circuit for selectively configuring the single linear array of CCD detectors in one of a plurality of input modes to optically read information from the off-screen medium. As a result, a universal input device for the computer is provided.

The plurality of input modes comprises at least a static mode input. The static mode input is defined as input through the single linear array of detectors without relative movement of the single linear array with respect to the off-screen medium.

The plurality of input modes also comprises at least one linear dimensional mode. The linear dimensional mode is defined as relative movement of the single linear array of detectors with respect to the off-screen medium in a line of direction.

The plurality of input modes still further comprises at least a two-dimensional input mode. The two-dimensional input mode is defined as relative motion of the single linear array of detectors in at least two noncolinear directions with respect to the off-screen medium.

In one embodiment the off-screen medium comprises a grid. The grid comprises in turn a plurality of horizontal lines and a plurality of diagonal lines. The horizontal lines are detected by the circuit through the single linear array of optical detectors to detect relative motion of the apparatus with respect to the off-screen medium in a direction perpendicular to the horizontal lines. Detection of relative movement with respect to the diagonal lines is interpreted by the circuit to indicate motion of the apparatus parallel to the horizontal lines, so that the apparatus is operable as a mouse input device.

In another embodiment the detectors is packaged in the form of a pen and movement of the single linear array of detectors across the off-screen medium or grid is interpreted by the circuit as a pixel map of handwriting input.

The off-screen medium may also comprise a plurality of unique positions, either denoted by a position relative to a predetermined origin or by an embedded bar code. Each of the positions corresponds to an alphanumeric character or command. The circuit identifies the unique position and generates an ASCII code corresponding to the alphanumeric character or command.

The off-screen medium may include bar codes. The circuit further comprises an activating switch. The single linear array of detectors is disposed across one of the bar codes without movement of the single linear array of detectors across the bar code, and the activating switch is activated to read the bar code upon switch activation. The bar codes may be user-defined or have a predetermined standardized definition.

In another embodiment the bar codes include at least one clock bar. The circuit selectively detects the clock bar to asynchronously time detection of remaining bars in the bar code as the single linear array of detectors are moved thereacross, so that the rate of motion of the single linear array of detectors with respect to the bar codes may be arbitrary.

The off-screen medium may include the grid and a plurality of bar code patterns readable by the apparatus. At least one of the plurality of bar code patterns corresponds to a macro instruction for controlling the computer.

The horizontal lines of the grid comprise a plurality of horizontal lines of a first predetermined thickness and are spaced apart from each other by a distance which, when focussed on the linear array of detectors, has an image with a length less than the length of the single linear array of detectors. Throughout the specification the optical length of the grid or bar code may be compared interchangeably with the optical length of the linear array depending on what image is actually or imaginarily projected onto the other. The context of the statement will make it clear whether the detector or the detected markings is the reference or physical image and the other the optical image. The plurality of diagonal lines comprise a plurality of diagonal line segments disposed between each of the horizontal lines. The diagonal line segments have a second thickness. The horizontal lines are distinguishable by the circuit from the diagonal lines in part due to their relative thicknesses.

The off-screen medium comprises at least one line of text having at least one character in the line. The apparatus further comprises a ruler for guiding the single linear array of detectors in a predetermined relative position with respect to the line of text. A positioning element positions the single linear array detectors at a predetermined first position relative to a corresponding first character position in the line of text and a predetermined last character position in the line of text. In this way the entire line of text is reliably scanned.

The positioning element is used to dispose the single linear array of detectors to the left of the first character position by a predetermined scan distance and to position the last position of the single linear array of detectors to the right of the last character position by a predetermined scan distance. The circuit for selectively providing input further selectively ignores output from the single linear array of detectors for the predetermined scanned distances to the left of the first character position and to the right of the last character position to ensure that the entire length of the text line is fully and reliably scanned.

The ruler may further comprise a plurality of positions having bar codes disposed thereon readable by the apparatus.

The invention is also a method of providing a universal input device for a computer comprising the steps of providing a single linear array of detectors, and generating an output from the single linear array of detectors from an off-screen medium over which the detectors are disposed. The output from the single linear array of detectors is selectively interpreted according to one of a plurality of modes. The plurality of modes comprises a static mode wherein the single linear array of detectors and off-screen medium are relatively fixed with respect to each other during generation of the output; a linear mode wherein the single linear array of detectors are moved with respect to the off-screen medium in a single direction during the step of generating the output; and a two-dimensional mode wherein the single linear array of detectors are moved in two noncolinear directions with respect to the off-screen medium during the step of generating the output. As a result, the universal input device is selectively operated as a point-and-click bar code reader, bar code scanner, mouse, handwriting input, and text scanner.

The invention may be better visualized by now turning to the following drawings wherein like elements are referenced by the like numerals.

BRIEF DESCRIPTION OF THE DRAWINGS

FIG. 3 is a symbolic diagram which illustrates how the line CCD detector is used to detect both horizontal and vertical movement in the grid shown in FIG. 2.

FIG. 4 is a diagrammatic depiction of a single linear CCD detector of the invention used to read bar code in a click and point mode or zero dimensional mode.

FIG. 5 is a diagrammatic depiction of a single linear CCD detector of the invention used to read bar code in a scanning mode or one dimensional mode.

FIG. 6 is a symbolic depiction illustrating scanning of a line of text in which the CCD linear detector is positioned at a predetermined distance to the left of the first character at the start of the text line.

FIG. 7 is a symbolic depiction illustrating scanning of a line of text in which the CCD linear detector is positioned at a predetermined distance to the right of the last character at the end of the scan line.

The invention in its preferred and other embodiments can now be better understood by turning to the following detailed description.

DETAILED DESCRIPTION OF THE PREFERRED EMBODIMENTS

The invention is a universal input device for a computer which can be either used as a point-and-click bar code reader, a bar code scanner, mouse, handwriting input, or text scanner. The universal input device can be used to read both arbitrary user-defined bar code or standardized bar code. In either case, the bar code may symbolize any alphanumeric character, command or macro instruction for an operating system which is programmed on the computer. The universal input device uses a single line of linear CCD detectors. In the static mode, the single linear array is used as a point-and-click input device for bar code, provided that the optical length of the bar code is equal to or less than the length of the single linear array. The optical length of the bar code is defined as the length of the bar code image as it is focussed on the linear array. The length of the bar code itself is the distance between the first and last bars in the collection of bars comprising the bar code. In the linear mode, the optical length of the bar code may exceed the length of the single linear array and the array is then moved or scanned over the bar code so that the direction of the linear array is colinear with the length of the bar code. In the two-dimensional mode, a grid is used in combination with the single linear array to detect vertical and horizontal motion of the array. Alternatively, a scanning ruler with diagonal timing bars may be used to guide the array across the line of text which then processed for character recognition. Still further, the array can be used in the two-dimensional mode to provide a bit map of handwriting. Used to read bar codes or as a mouse, the input device can be used to simulate an ASCII keyboard to input ASCII codes corresponding to the alphanumeric characters.

Figure 1:
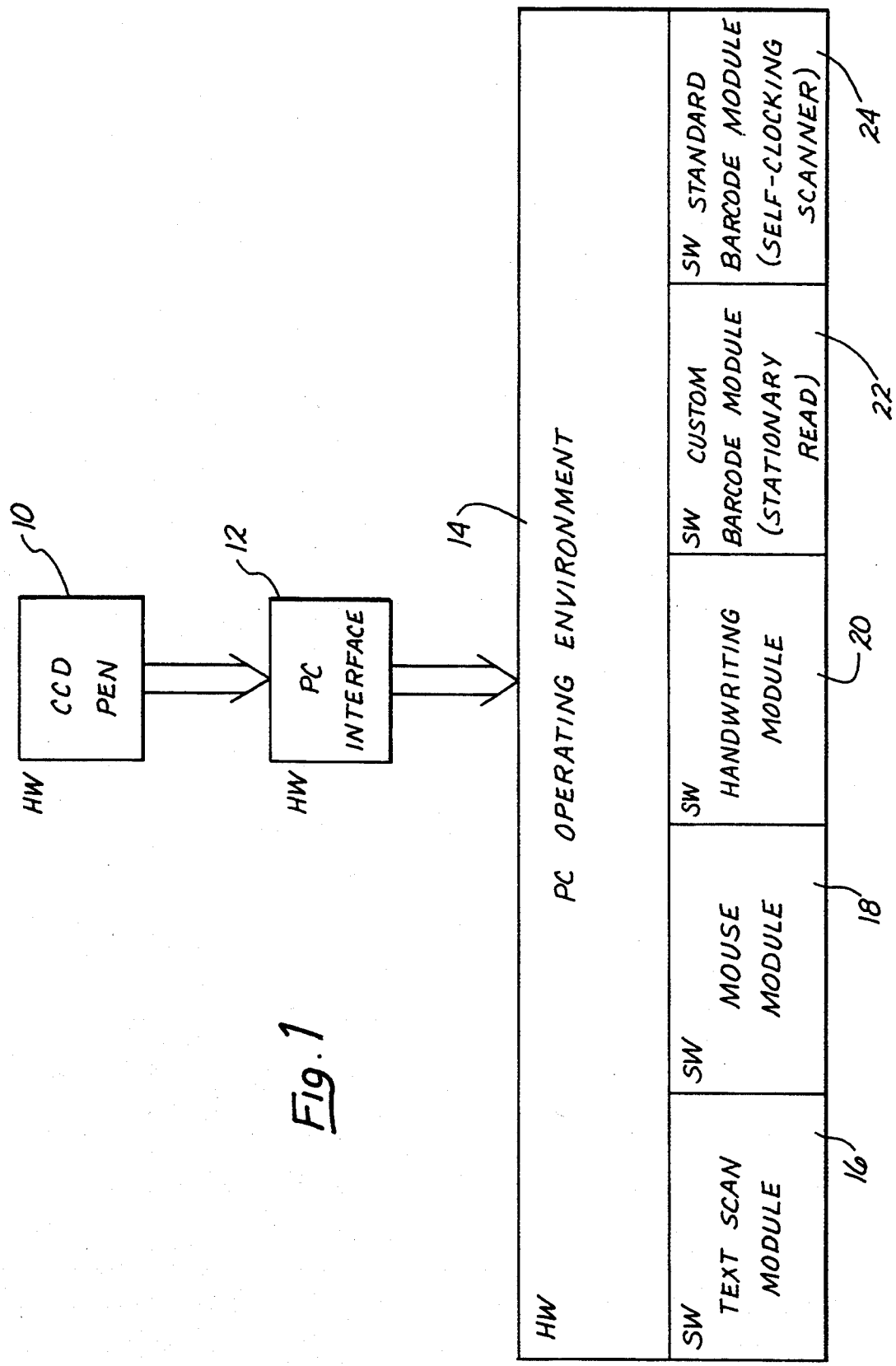
FIG. 1 is a block diagram of the overall CCD pen system of the invention.

FIG. 1 is a block diagram which illustrates a system devised according to the teachings of the invention. A pen 10 or other hand-held apparatus, which includes a single linear CCD array, is coupled as an input device to a PC interface card 12. PC interface card 12 conditions and formats the signals output from pen 10 so that they are intelligibly communicated to a conventional computer or more particularly a conventional personal computer operating system 14, such as the data and control bus. Computer system 14 is provided with software that allows the system of FIG. 1 to be operated according to user selection as a text scanning module, a mouse module, a handwriting input module, a custom bar code module or a standard bar code module. Software modules corresponding to these modes of operation are symbolically illustrated in FIG. 1 as text scan module 16, mouse module 18, handwriting input module 20, custom bar code module 22, and standard bar code module 24. In the preferred embodiment, modules 16–24 are software modules stored within a conventional computer systems hard disk memory, random access memory card, or in nonvolatile read-only memories.

The system operates through text scan module 16 to operate as a scanning optical character reader, or pixel scanner with program features which include display, editing, storage and graphic PCX or other formats and form later retrieval and optical character recognition (OCR).

The system of FIG. 1 when operated as a mouse module 18 is capable of performing as a high resolution, 400 dot per inch, or low resolution, 200 dot per inch, mouse or drawing pencil with adjustable speed and distance parameters equivalent to such adjustments as are provided for conventional light pens.

The system of FIG. 1 is also capable of operating as a handwriting input module 20 of high 400 dot per inch resolution or low 200 dot per inch resolution, again in the combination with a grid pad described in greater detail in connection with FIG. 2. When so operated system 14 with pen 10 is capable of inputting signatures or other handwriting for storage in graphic PCX or other formats.

The input device in the system of FIG. 1 can also be used as a bar code reader by means of a custom bar code module 22, which includes the capability of printing user defined bar codes. The user defined bar codes can be used as function keys or optically read macros of any application's program loaded within the computer system of FIG. 1, which bar codes can also be mounted on the periphery of and read from the grid pad of FIG. 2.

In addition to reading custom bar codes, the system of FIG. 1 operates as a standard bar code module to read in bar codes having standardized formats in such a manner that the scan is speed independent. As a custom or standardized bar code reader pen 10 and system 14 in combination may be used statically to point-and-click the entire bar code in or may be scanned across the bar code.

These functions can be considered as operating in three modes. First, there is the static mode or what might be termed a zero dimensional mode in which pen 10 is statically placed over a region of printed bar code without movement. The bar code is read or scanned while pen 10 remains stationary. Operation in this mode is referred to as "point-and-dick."

A second mode of operation is defined as a one dimensional operation or linear scanning. In this mode, pen 10 is moved by hand along a line, which preferably is a straight line, but need not be. In this mode, pen 10 operates as a scanner.

Figure 2:
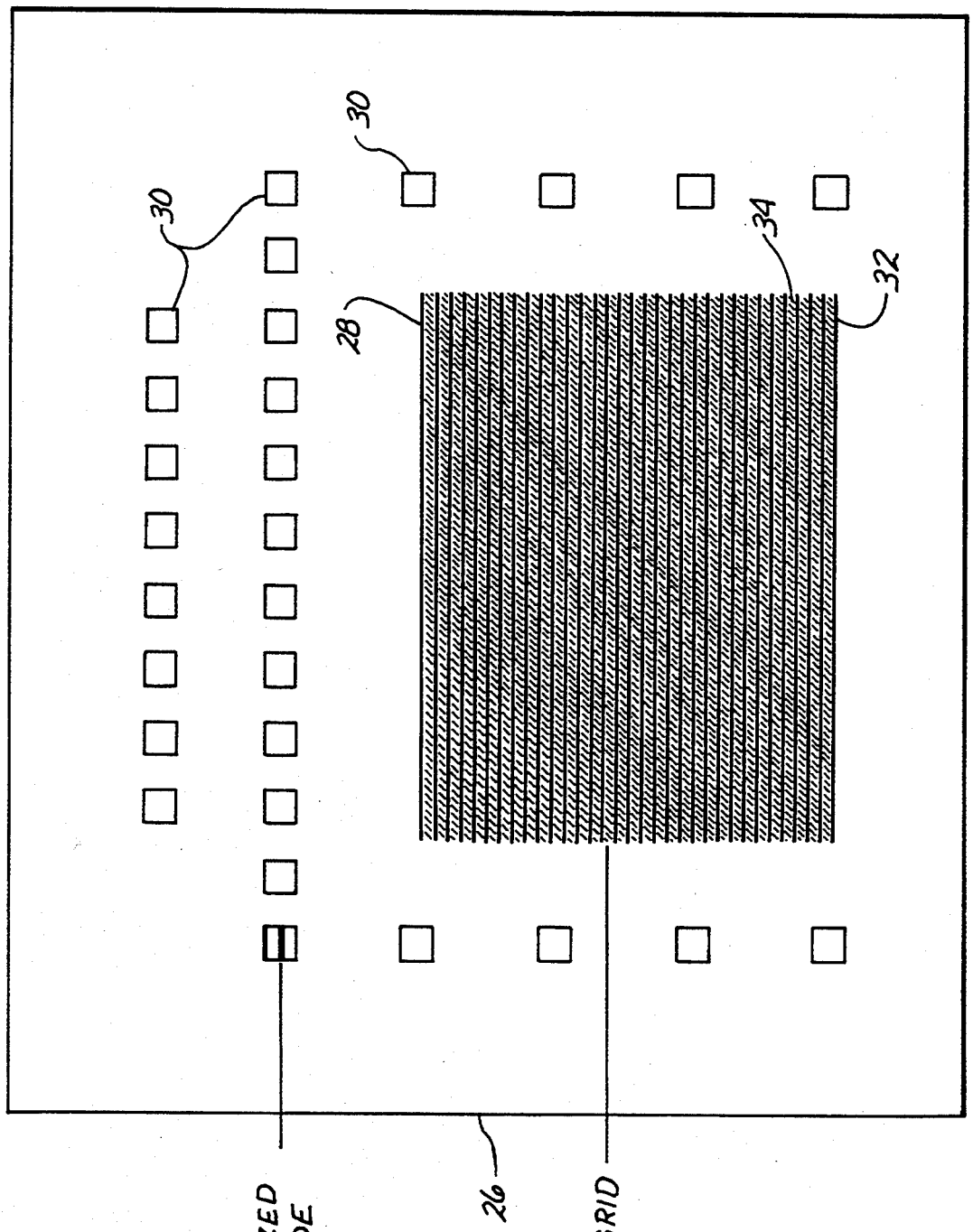
FIG. 2 is a plan view of the pad or grid upon which the pen is used in order to operate as a drawing board or mouse or in a two dimensional mode.

The third mode of operation is described as a two dimensional mode in which pen 10 is used in connection with a grid shown in FIG. 2 as a mouse, bit map input device such as for handwriting input.

Turn now to FIG. 2 wherein pad 26 is diagrammatically illustrated in top plan view. Pad 26 includes a central portion comprising a grid 28 surrounded by a plurality of bar code areas 30. Some of the areas 30 may be provided with standardized bar codes which are permanently provided or others may provide for customized bar codes generated by the system of FIG. 1 in response to interactive user input and which can be temporarily inserted into or onto pad 26.

Grid 28 is a two-dimensional area, preferably a rectangular area in which a plurality of thick horizontal lines 32 and interlying diagonal lines 34 have been provided. The thicker horizontal lines 32 extend across the entire width of grid 28. The shorter and thinner diagonal lines 34 are placed in the spaces between horizontal lines 32 and extend only part way across the distance separating adjacent horizontal lines 32.

Turn now to FIG. 3 which is a symbolic diagram in enlarged scale of a small portion of grid 28 of FIG. 2. FIG. 3 depicts portions of two adjacent horizontal lines 32 with three interlying diagonal lines 34a, b and c therebetween. In the illustrated embodiment, diagonal lines 34a, b, and c are inclined at an angle of approximately 45 degrees. Lines 34a, b and c and 32 are printed in contrasting color on a substrate such as heavy paper, which may be included within a laminated or flat plasticized envelope constituting part of grid pad 26.

Line 36 in FIG. 3 symbolizes a single linear array of charge coupled detector (CCD) elements included within pen 10. Assume that array 36 is aligned vertically across grid 28 so that single linear array 36 is perpendicular to horizontal lines 32 and crosses diagonal segments 34a at an angle of approximately 45 degrees. An upper group 38 of the detector elements of array 36 will detect the upper bar 32 while a lower group 40 of detectors detect the adjacent lower bar 32b in FIG. 3. At some point in the middle of line array 36 between group 38 and group 40, a group 42 will detect horizontal segment 34a. The number of pixels detected by groups 38 and 40 will be equal and each be greater in number than the number of pixels detected by group 42 since horizontal bars 32 are thicker than diagonal segments 34a, b, and c even when increased for a diagonal section. The number of the detected pixels from groups 38 and 40 will identify the pixels detected by group 42 as the pixel group measuring or corresponding to one of the diagonal lines 34a, b or c.

If single linear array 36 moves vertically in FIG. 3, the number of pixels detected by groups 38, 40 and 42 will remain substantially constant. However, the position of the detectors on single linear array 36 for which a pixel is detected will change equally for each of the groups 38–42. Therefore, if single linear array 36 has a 400 dot per inch pixel resolution, a change of the position of any one of the groups 38–42 on single linear array 36 by 40 detector positions will be measured as one tenth inch displacement of pen 10 in the vertical direction.

If, however, single linear array 36 moves horizontally or to the right in FIG. 3, the number and location of pixels in group 38 and 40 remain constant. The number of pixels in group 42 also remain substantially constant but the location of these pixels will move upward in the diagram of FIG. 3. Since diagonal segments 34a, b and c are at a 45 degree angle, the movement of one detected pixel upward in group 42 indicates a horizontal movement equal to the resolution limit of one pixel, which in this example is one four hundredth of an inch.

As pen 10 continues to move horizontally or to the right in FIG. 3, a line at position 44 will ultimately be reached in which single linear array 36 spans two adjacent diagonal segments 34a and 34b. Two groups functionally equivalent to group 42 will then be provided between groups 38 and 40. This serves as a trigger signal to indicate to computer 14 that single linear array 36 is straddling two adjacent diagonal bars 34a and 34b. As soon as full overlap is lost from diagonal bar 34a, internal software counters must be reset in the position of the lower pixel group, which now lies over diagonal bar 34b, which is monitored to further track horizontal movement. Movement to the left of FIG. 3 is of course handling in just the reverse manner. In any case, total horizontal movement relative to a start position can be measured in absolute terms.

Alternatively, the relative separation or pixel distance between either group 38 and group 42, or between group 40 and 42 may be monitored to determine when the end of line 34a is reached and counters reset to remeasure horizontal movement relative to the distance between these two groups as read from the adjacent line 34b.

Movement of pen 10 simultaneously in the horizontal and vertical directions on grid 28 produces the two independent output patterns from single linear array 36, namely simultaneous and equal changes in the position of the detecting groups 38–42 on single linear array 36 for vertical movement and relative movement of group 42 with respect to groups 38 and/or 40 for horizontal movement.

In the description above and in FIG. 3, single linear array 36 has been shown in the vertical orientation for the sake of simplicity of understanding and illustration. What is depicted is not necessarily the relative physical size of the linear array, but the optical projection of the linear array onto the grid through the optics used in the device. If single linear array 36 were inclined at an arbitrary angle with respect to lines 32 and 34a, b and c, the analysis would not be materially changed. The only difference caused by inclination of single linear array 36 with respect to lines 32 and 34 of grid 28 is that the intercept length of groups 38–42 across lines 32 and 34a, b, and c are increased. The amount of increase is strictly geometrically related to the degree of inclination and is uniform for each of the groups 38–42. Any variation in the intercept length, can thus be easily accommodated or even ignored without changing the analysis whereby horizontal and vertical movement are detected as described above. It is both the absolute and relative relationship between the positions of groups 38–42 on single linear array 36 that indicate vertical or horizontal movement and not how many pixels are detected by each group.

Consider now the various modes of operation beginning with the zero dimensional or static mode. The static mode, used as a static bar code reader, is the simplest of all modes in which CCD single linear array 36 is placed over a bar code pattern 46 as diagrammatically depicted in enlarged view in FIG. 4. A switch included on pen 10 (not shown) is then manually depressed to point-and-click single linear array 36 over bar code 46. The number, width, or both of the bars comprising bar code pattern 46 are then detected by the various detectors on single linear array 36. Linear array 36 is held stationary and all the pixel detecting cells within single linear array 36 are electronically scanned to provide a sequential series of input bits. In effect, a bit map of a slice of bar code pattern 46 is obtained and this bit map can then be read either using user-defined custom bit code formats or adopting standardized bit code formats, according to conventional software control by either custom bar code module 22 or standard bar code module 24 within the system of FIG. 1.

Consider now the first dimensional or linear direction mode. Single linear array 36 is symbolically shown in FIG. 5 in enlarged scale as being manually drawn or moved across a bar code pattern 48. A first bar 50 in pattern 48 is a clock bar which provides a timing signal through single linear array 36. The rate of change at which the bar code creates a signal propagating down single linear array 36 is a direct measurement of the speed of manual scanning of array 36 and is used for asynchronous scan timing during the entire scan. Therefore, when single linear array 36 reaches the remaining bars 52 in bar code pattern 48, the width of bar code 52 is measured according to the pixels which are clocked or strobed as single linear array 36 is scanned over pattern 48 as driven by a clock signal triggered by clock bar 50. Therefore, even an arbitrarily moved scan will nevertheless accurately scan or measure the width of bar 52.

The need to switch from the old clock bar to a new clock bar is triggered by tracking the clock bar as it moves down single linear array 36. When this tracked clock bar reaches the last position in single linear array 36, the next detection at the beginning pixel of the single linear array will then be treated and tracked as the new clock bar. Only pixel detections to the right of the clock bar pixel will be used so that when a new clock bar pixel is reset at the beginning or right end of single linear array 36 in FIG. 5, pixel detections to the left of it, which have already been detected with respect to the old and prior clock bar, but will still be under the line of scan of single linear array 36, will be ignored. Only new detections which occur in single linear array 36 to the right of the new clock pixel will be acknowledged.

Clearly, accurate clocking occurs only so long as clock bar 50 remains under the line of scan of single linear array 36. For this reason, bar code pattern 48 periodically includes clock bars 50 at intervals which do not exceed the length of single linear array 36, which is typically approximately 0.320 inch. Therefore, clock bar 50 is always under single linear array 36 and a clock signal accordingly generated. This is illustrated by comparing the first position 54 of single linear array 36 with single linear array 36 at the second position 56 shown in dotted outline in FIG. 5. Both standardized and custom bars of arbitrary length may thus be scanned. The scanning mode of FIG. 5 will be used in preference to the point-and-click mode of FIG. 4 when, for example, the bar code whether in standardized format or custom format, is too long to be included under the optical length of single linear array 36.

FIG. 6 is a symbolic depiction of pen 10 used to scan a line of text 58. A general methodology usable with the present invention for text scanning is described in the copending application referenced above, which is herein incorporated by reference. One of the persistent problems in text scanning has been the loss of a portion of the first or last character in the text line. According to the invention, scanning pen 10 is placed to the left of a first character 60 in text line 58 by a predetermined distance 62 which is illustrated as the distance between CCD linear array 36 and the right edge 64 of pen 10. This predetermined position can easily be sighted and manually aligned by the user. The scanned pixels starting from position 66 to edge 64 are automatically discarded according to program control so that the retained pixel scans start from the left edge of first character 60 coincident with edge 64 and continue to the right. In this manner, it can be ensured that the entire field of the first character is completely scanned and errors in the beginning of the scan line avoided.

The identical problem with respect to the last character 68 in text line 58 is illustrated in the diagrammatic depiction of FIG. 7 wherein pen 10 is moved or scanned beyond last character 68 by a predetermined distance 70. Distance 70 in the illustrated embodiment is the distance between the left edge 72 of pen 10 and point 66 of single linear array 36, which is easily sighted and manually positioned by the user. Again, according to program control, the number of scanned pixels which occur in distance 70 are automatically discarded. This ensures that the complete field of last character 68 is completely scanned and end-line scan errors avoided.

Clocking and guiding of pen 10 along text line 58 is controlled by means of a ruler 74, similar in concept to that described in the copending related application incorporated above. In addition, ruler 74 of the present embodiment may include a plurality of bar code sections 76 of standardized or custom bar codes which can be also read by pen 10 either in the static or linear modes.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the germ of the invention.

I claim:

1. An apparatus for providing input to a computer from an off-screen medium comprising:
   a handheld pen;
   a single linear array of optical detectors disposed in said pen;
   input logic means coupled to said linear array and to said computer for selectively configuring said single linear array of detectors in one of a plurality of input modes including at least a two-dimensional input mode to optically read information from said off-screen medium into said computer, said two-dimensional input mode being defined as relative motion of said single linear array of detectors in at least two noncolinear directions with respect to said off-screen medium;
   wherein said off-screen medium comprises a grid, said grid comprising in turn a plurality of horizontal lines and a plurality of diagonal lines, said horizontal lines being detected by said input logic means through said single linear array of optical detectors to detect relative motion of said apparatus with respect to said off-screen medium in a direction perpendicular to said horizontal lines, detection of relative movement with respect to said diagonal lines being interpreted by said input logic means to indicate motion of said apparatus parallel to the said horizontal lines, so that said apparatus is operable as a mouse input device, said horizontal lines of said grid comprising a plurality of horizontal lines of a first predetermined thickness and spaced apart from each other by a dimension less than the optical length of said single linear array of detectors, and wherein said plurality of diagonal lines comprise a plurality of diagonal line segments disposed between each of said horizontal lines, said diagonal line segments having a second thickness, said second thickness being distinguishable by said input logic means from said first thickness,
   whereby a universal input device for said computer is provided.

2. An improvement in an apparatus for providing a mouse input to a computer through a single linear array of photodetectors from an off-screen medium, said single linear array of photodetectors disposed in said apparatus and having an optical length, comprising:
   a grid comprising a plurality of horizontal lines and a plurality of diagonal lines,
   said horizontal lines being detected by said single linear array to detect relative motion of said apparatus with respect to said off-screen medium in a direction perpendicular to said horizontal lines, said horizontal lines having a first predetermined thickness and spaced apart from each other by a dimension less than said optical length of said single linear array; and
   means for detecting relative movement of said apparatus with respect to said diagonal lines to indicate motion of said apparatus parallel to the said horizontal lines, so that said apparatus is operable as a mouse input device, said plurality of diagonal lines comprising a plurality of diagonal line segments disposed between each of said horizontal lines, said diagonal line segments having a second thickness, said second thickness being distinguishable by said apparatus from said first thickness,
   whereby a universal input device for said computer is provided.

3. An apparatus for providing input to a computer from an off-screen medium comprising:
   a handheld pen;
   a single linear array of optical detectors disposed in said pen;
   input logic means coupled to said linear array and to said computer for selectively configuring said single linear array of detectors in one of a plurality of input modes to optically read information from said off-screen medium into said computer, one of said input modes being a text line scanning mode wherein said input logic means receives output from said linear array as scanned text and generates unique codes corresponding to said scanned text,
   wherein said plurality of input modes comprises at least a static mode input, said static mode input being defined as input through said single linear array of detectors without relative movement of said single linear array with respect to said off-screen medium;
   wherein said text line scanning mode is a linear dimensional mode, said linear dimensional mode being defined as a sequence of data which is input as a result of relative movement of said single linear array of detectors with respect to said off-screen medium in a line of direction; and
   wherein said plurality of input modes comprises at least a mouse input mode which is a two-dimensional input mode, said two-dimensional input mode being defined as data which is input while said single linear array of detectors is arbitrarily moved in at least two noncolinear directions with respect to said off-screen medium, said data being indicative of the position in two dimensions of said linear array on said off-screen medium, said off-screen medium comprising a grid, said grid comprising in turn a plurality of horizontal lines and a plurality of diagonal lines, said horizontal lines being detected by said input logic means through said single linear array of optical detectors to detect relative motion of said apparatus with respect to said off-screen medium in a direction perpendicular to said horizontal lines, detection of relative movement with respect to said diagonal lines being interpreted by said input logic means to indicate motion of said apparatus parallel to the said horizontal lines, so that said apparatus is operable as a mouse input device, said horizontal lines of said grid comprising a plurality of horizontal lines of a first predetermined thickness and spaced apart from each other by a dimension less than the optical length of said single linear array of detectors, and wherein said plurality of diagonal lines comprise a plurality of diagonal line segments disposed between each of said horizontal lines, said diagonal line segments having a second thickness, said second thickness being distinguishable by said input logic means from said first thickness,
   whereby a universal input device for said computer is provided.

4. The apparatus of claim 3 wherein data input as a result of movement of said single linear array of detectors across said off-screen medium is interpreted by said input logic means as a pixel map of handwriting.

5. The apparatus of claim 3 wherein said off-screen medium comprises a plurality of unique positions, each of said positions corresponding to a character/command, said input logic means identifying said unique position and generating a digital code corresponding to said character/command.

6. The apparatus of claim 3 wherein said off-screen medium comprises bar codes having a plurality of bars, said bar codes including at least one clock bar, said input logic means for selectively detecting said clock bar to asynchronously time detection of remaining bars in said bar code as said single linear array of detectors are moved thereacross, so that the rate of motion of said single linear array of detectors with respect to said bar codes may be arbitrary.

7. A method of providing a universal input device for a computer comprising the steps of:
   providing a single linear array of detectors;
   generating an output from said single linear array of detectors from an off-screen medium over which said detectors are disposed; and
   selectively interpreting said output from said simple linear array of detectors according to one of a plurality of modes, said plurality of modes comprising a static mode defined as a sequence of data which is input while said single linear array of detectors and off-screen medium is relatively fixed with respect to each other during generation of said output, a linear mode defined as a sequence of data which is input while said single linear array of detectors is moved with respect to said off-screen medium in a single direction during said step of generating said output, said sequence of data being selectively interpreted as either text data or pixel data, and a two-dimensional mode defined as data which is input while said single linear array of detectors is arbitrarily moved in two noncolinear directions with respect to said off-screen medium during said step of generating said output, said data being indicative of the position in two dimensions of said linear array on said off-screen medium, wherein said off-screen medium comprises a grid, said grid comprising in turn a plurality of horizontal lines and a plurality of diagonal lines,
   wherein selectively interpreting said output senses said horizontal lines by said input logic means through said single linear array of optical detectors to detect relative motion of said apparatus with respect to said off-screen medium in a direction perpendicular to said horizontal lines, detection of relative movement with respect to said diagonal lines being interpreted by said input logic means to indicate motion of said apparatus parallel to the said horizontal lines, so that said apparatus is operable as a mouse input device, said horizontal lines of said grid comprising a plurality of horizontal lines of a first predetermined thickness and spaced apart from each other by a dimension less than the optical length of said single linear array of detectors, and wherein said plurality of diagonal lines comprise a plurality of diagonal line segments disposed between each of said horizontal lines, said diagonal line segments having a second thickness, said second thickness being distinguishable by said input logic means from said first thickness in said step of selectively interpreting,
   whereby said universal input device is selectively operated as a point-and-click bar code reader, bar code scanner, mouse, handwriting input, and text scanner.

* * * * *